United States Patent [19]

Czerwinski

[11] 4,142,693
[45] Mar. 6, 1979

[54] COILABLE RULE

[75] Inventor: Frank G. Czerwinski, East Berlin, Conn.

[73] Assignee: The Stanley Works, New Britain, Conn.

[21] Appl. No.: 839,495

[22] Filed: Oct. 5, 1977

[51] Int. Cl.² ............................................ B65H 75/48
[52] U.S. Cl. .................................. 242/107; 33/138
[58] Field of Search ............... 242/107, 107.1–107.15, 242/84.8; 33/138

[56] References Cited

U.S. PATENT DOCUMENTS

| | | | |
|---|---|---|---|
| 552,243 | 12/1895 | Feeney et al. | 242/107 |
| 2,168,675 | 8/1939 | Lofgren et al. | 242/107.6 |
| 2,510,939 | 6/1950 | Carlson | 242/107.3 |
| 3,578,259 | 5/1971 | Zelnick | 242/107.6 X |
| 3,705,962 | 12/1972 | Banister | 242/107 X |
| 3,744,733 | 7/1973 | Bennett | 242/107.3 |

Primary Examiner—Harvey C. Hornsby
Assistant Examiner—John M. Jillions
Attorney, Agent, or Firm—Prutzman, Kalb, Chilton & Alix

[57] ABSTRACT

A mounting spool for the measuring blade and recoil spring of a coilable rule is designed to minimize blade friction and to absorb the shock of impact when the blade is retracted and abruptly stopped. The spool comprises a circular rim having a pair of upstanding side flanges for receiving the coiled measuring blade and a side wall portion formed on one side of the rim and adapted to rotatably support the spool on the center post. The recoil spring is received inside the rim with its inner end anchored to the center post and its free end extending through an opening formed in the rim for connection to the measuring blade. A slit is formed in the flange on the side of the rim opposite to the side wall portion which extends completely through the flange and joins the opening in the rim.

3 Claims, 3 Drawing Figures

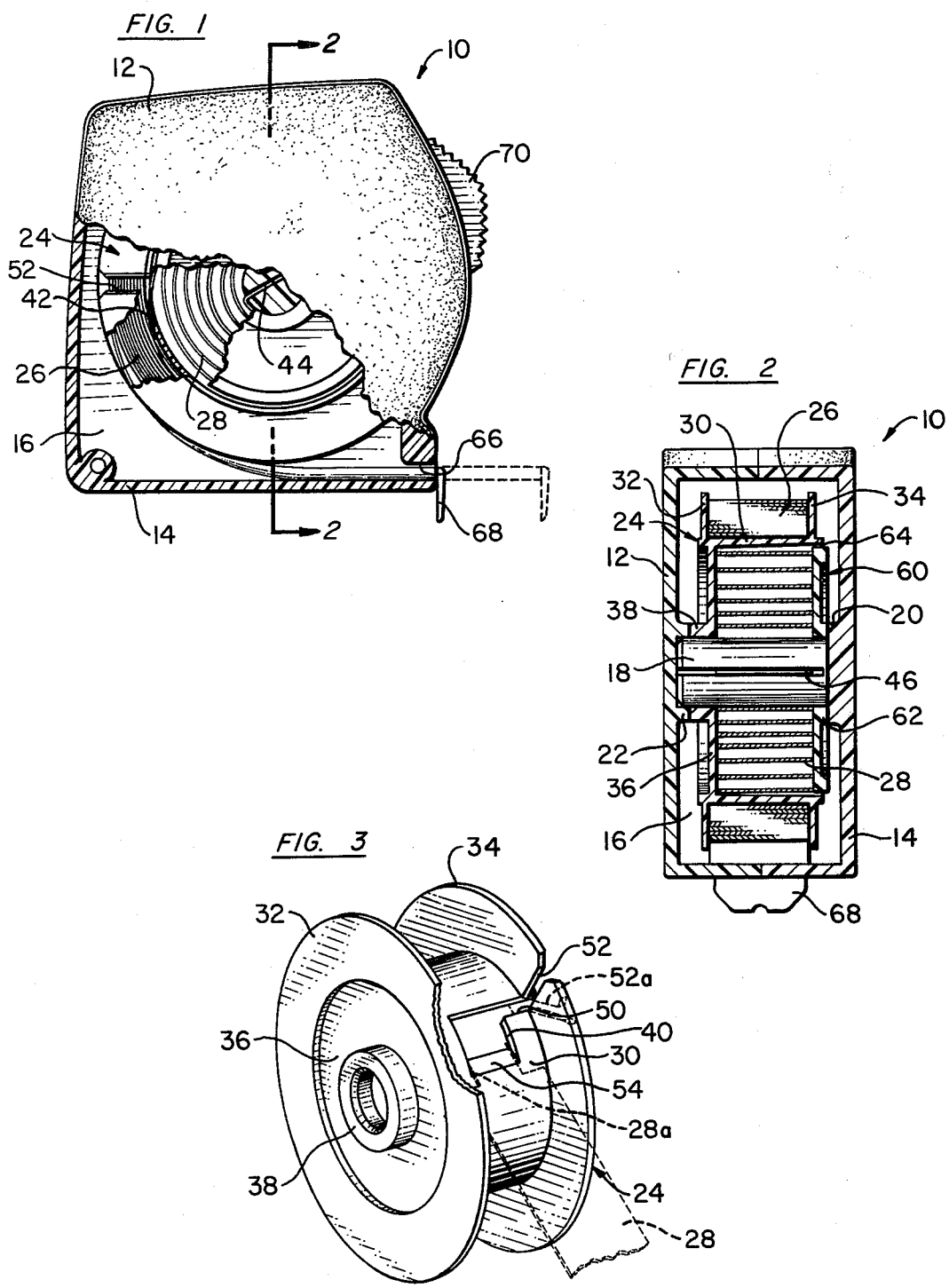

COILABLE RULE

The present invention relates to coilable rules and, more particularly, to an improved spool construction for supporting the measuring blade and recoil spring of a coilable rule. The invention constitutes an improvement in the type of coilable rule disclosed and claimed in U.S. patent application Ser. No. 750,112, filed Dec. 13, 1976, now U.S. Pat. No. 4,067,513 and assigned to the same assignee of the present invention.

In coilable rules, frictional contact at the edges of the measuring blade and recoil spring with the inside of the rule casing results in undesirable wear of the rule components and makes the rule more difficult to operate. Also, the shock of impact which occurs when the measuring blade is retracted into the housing by the recoil spring and abruptly stopped upon complete retraction tends to prematurely wear out the rule components. The shock absorbing and cushioning devices previously proposed in the prior art typically constitute separate components formed on or mounted within the rule casing. Such devices have complicated and increased the cost of manufacture of coilable rules.

An object of the present invention is to provide an improved spool construction for a coilable rule to reduce frictional wear on the measuring blade and recoil spring and to cushion the shock of impact when the blade is abruptly stopped upon retraction by the spring.

Another object of the invention is to provide an improved mounting spool for the measuring blade and recoil spring of a coilable rule, which absorbs the shock of impact when the blade retraction is terminated and eliminates the need for separate cushioning devices formed on or mounted within the housing.

The present invention is embodied in an improved spool construction for supporting the measuring blade and recoil spring of a coilable rule, comprising a circular rim having a pair of upstanding flanges at its opposite sides to define an outer, annular space therebetween for receiving the coiled measuring blade, a side wall portion formed on one side of the rim and adapted to be journalled on the center post to support the spool for rotation relative to the housing, the side wall portion and the rim providing an inner, annular space around the center post for receiving the recoil spring, an opening formed in the rim to allow a free end of the recoil spring to extend therethrough for connection to the measuring blade, the other end of the recoil spring being anchored to the center post, and an outwardly extending slit formed in the flange on the opposite side of the rim which extends completely therethrough and joins the opening in the rim. In the preferred embodiment, a washer is adapted to be journalled on the center post at a position spaced from the side wall portion of the spool adjacent to the other side of the rim to prevent frictional contact between the recoil spring and housing.

The split flange allows one side of the spool to close slightly in the slit area when the blade retraction is abruptly terminated. The resilient action of the spool is sufficient to absorb the recoil shock and eliminates the need for separate shock absorbers or cushioning devices.

The accompanying drawing illustrates a preferred embodiment of the invention and together with the description, serves to explain the principles of the invention.

In the drawing:

FIG. 1 is a partially cutaway side view of a coilable rule including the improved spool construction of the present invention;

FIG. 2 is a vertical section of the coilable rule taken along line 2—2 of FIG. 1; and FIG. 3 is an enlarged perspective view of the spool, partially cutaway to illustrate a novel window and slit arrangement formed in the rim and one side flange of the spool.

Referring to FIGS. 1 and 2, the casing for a coilable rule, generally 10, comprises a pair of mating casing sections 12 and 14 which join to define a hollow chamber 16 for receiving the other components of the rule. The casing includes a center post 18 preferably formed as an integral part of one of the casing sections. As shown in FIG. 2, center post 18 is formed integrally with a truncated stud member 20 provided on the inside of casing section 14. A similar truncated stud section 22 provided on section casing 12 includes a central opening for receiving the extended end of center post 18. The casing sections may be formed of metal or plastic. The center post may, alternatively, be formed as a separate component which is fastened to the casing sections.

The coilable rule includes a spool, generally 24, constructed in accordance with the invention, for supporting a resilient measuring blade 26 and a recoil spring 28. The spool includes a circular rim 30 provided with a pair of upstanding flanges 32 and 34 at its opposite sides which define an outer, annular space for receiving the coiled measuring blade. The spool also includes a side wall portion 36 formed on the same side of the rim as flange 32. Side wall portion 36 is provided with an enlarged hub 38 which is journalled on center post 18 to support spool 24 for rotation relative to the casing. Rim 30 and side wall portion 36 provide an inner, annular space around center post 18 for receiving recoil spring 28. With spool 24 mounted on center post 18, hub 38 abuts truncated stud portion 22 of casing section 12. The spool is preferably made of plastic.

Referring to FIG. 3, rim 30 is provided with an opening 40 in the form of a rectangular window centrally located on the rim. The purpose of the opening is to allow a free end 42 (FIG. 1) of recoil spring 28 to extend through the rim for connection to the inner end of measuring blade 26. A well-known mechanical connection may be used to connect the measuring blade and recoil spring. Referring to FIGS. 1 and 2, the other, inner end 44 of recoil spring 28 is anchored in an axial slot 46 formed in center post 18. A slot 50 (FIG. 3) extends axially from one corner of rectangular window 40 to the edge of rim 30 adjacent to side flange 34. Flange 34 includes a radially extending slit 52 which extends completely through the flange and joins window 40 via slot 50. A tapered surface 54 is provided adjacent to window 40 to facilitate relative movement between recoil spring 28 and rim 30 of the mounting spool.

In the preferred embodiment, a washer, generally 60, includes a hub 62 which is journalled on center post 18 in abutment with truncated stud portion 20 of casing section 14. The washer is mounted at a position spaced from side wall portion 36 of the spool to enclose the inner annular space within the spool for receiving recoil spring 28 and to prevent frictional contact between the edge of the recoil spring and casing section 14. An annular gap 64 is provided between the periphery of washer 60 and the inner edge of spool rim 30 to eliminate friction between the spool and washer, which may also be made of plastic.

As shown in FIG. 1, measuring blade 26 passes through a mouth 66 formed in the casing sections and a hook 68 is mounted on its outer end to engage the casing and prevent complete retraction of the blade into the casing. The coilable rule is provided with a manually operated brake member 70 to lock the measuring blade in its extended positions. The brake mechanism is more fully disclosed and claimed in U.S. Pat. No. 3,214,836, assigned to the same assignee of the present invention.

In the assembly of coilable rule 10, washer 60 is initially placed in position on center post 18 and recoil spring 28 is anchored in slot 46 and wound around the center post. Then spool 24 is fitted over the coiled spring and its hub 38 placed over center post 18. The free end of recoil spring 28 is moved into opening 40 in the rim through slot 50 and slit 52. Next, measuring blade 26 is connected to the free end of recoil spring 28 and then wound around rim 30 of the spool. Finally, casing section 12 is secured to casing section 14 with the outer end of measuring blade 26 and hook 68 extending outwardly through mouth 66 to complete the rule assembly.

If desired, and as shown in dotted lines in FIG. 3, the end of spring 28 may be notched as at 28a to provide a necked-down portion with the notches spanning the side walls of the window 40 to fix the end of the spring to the spool 24. In this manner, the spool will be positively driven with the coiled measuring blade during the coiling and uncoiling operation. In addition, the spring cannot be withdrawn from the casing if it should break during use, but rather will be confined within the spool. Since the spring inherently assumes a coiled condition when free to do so, this prevents the possibility of the violent recoiling of the spring, as might occur if it were free to be pulled from the casing if broken. Also, and as shown in dotted lines at 52a in FIG. 3, the slit may be angled from a radial position to match the angle of the end of a coiled spring and facilitate assembly.

In the operation of the coilable rule, side flanges 32 and 34 prevent frictional contact between the edges of measuring blade 26 and the inside of the casing. Similarly, side wall portion 36 and washer 60 prevent frictional engagement between the edges of recoil spring 28 and the inside of the casing. As explained above, angular gap 64 eliminates frictional engagement between spool 24 and washer 60. Thus, the only blade friction encountered in the operation of the rule occurs in the scraping action at the edges of the measuring blade against side flanges 32 and 34 when it is wound and unwound from the spool. As indicated in FIG. 1, such scraping action occurs at only a small portion on the side flanges. Consequently, blade friction is minimal in the operation of the coilable rule.

When the measuring blade is retracted by the recoil spring, the improved spool construction allows the shock of impact which occurs when hook 68 strikes the casing and abruptly terminates blade movement to be absorbed by the spool. Slit 52 allows flange 34 to close slightly in the slit area. The resilient action of the spool provided by slit 52 is sufficient to absorb the recoil shock without the necessity of providing separate shock absorbers on or within the casing.

The invention in its broader aspects is not limited to the specific details disclosed and described, and modifications may be made in the coilable rule without departing from the principles of the invention.

What is claimed is:

1. In a coilable rule having a housing provided with a mouth for passing a resilient measuring blade, a center post mounted on the housing, and a recoil spring for retracting the blade into a coiled position within the housing, a spool for supporting the measuring blade and recoil spring comprising:

a circular rim having a pair of upstanding flanges at its opposite sides to define an outer, annular space therebetween for receiving the coiled measuring blade;

a side wall portion on one side of said rim adapted to be journalled on the center post to support said spool for rotation to the housing;

said side wall portion and said rim providing an inner, annular space around the center post for receiving the recoil spring;

said rim having an opening formed therein to allow a free end of the recoil spring to extend therethrough for connection to the measuring blade, with the other end of the recoil spring being anchored to the center post;

said flange on the opposite side of said rim having an outwardly extending slit which extends completely therethrough and joins said opening in said rim;

said opening in said rim comprising a rectangular window centrally located on said rim with a slot extending from said window and connecting with said slit; and the end of the spring being notched adjacent to the free end thereof to provide a necked-down portion, with the notches spanning the side walls of the window to secure the free end of the spring to the spool.

2. In a coilable rule having the housing provided with a mouth for passing a resilient measuring blade, a center post mounted on the housing, and a recoil spring for retracting the blade into a coiled position within the housing, a spool for supporting the measuring blade and recoil spring; said spool comprising:

a circular rim having a pair of upstanding flanges at its opposite sides to define an outer, annular space therebetween for receiving the coiled measuring blade;

a side wall portion on one side of said rim adapted to be journalled on the center post to support said spool for rotation relative to the housing;

said side wall portion and said rim providing an inner, annular space around the center post for receiving the recoil spring;

said rim providing a peripherally extending rectangular window of less width than said rim to allow a free end of the recoil spring to extend therethrough for connection to the measuring blade, with the other end of the recoil spring being anchored to the center post;

said flange on the opposite side of said rim having an outwardly extending slit which extends completely therethrough and joins said rectangular window in said rim; and a washer adapted to be journalled on the center post and positioned within said rim at said opposite side thereof to prevent frictional contact between the recoil spring and housing;

said washer further being radially spaced from said rim to form a radial annular clearance therewith to accommodate a contraction of said rim to cushion shock impact at the termination of recoil of the blade.

3. The device of claim 2 wherein:

said slit extends through said flange on the opposite side of said rim at an angle other than radial and in the same direction as the spiral of tape, and said slot extends axially between said window and said slit.

* * * * *